(12) United States Patent
Ajdelsztajn et al.

(10) Patent No.: US 9,611,391 B2
(45) Date of Patent: Apr. 4, 2017

(54) COATING METHODS AND COATED ARTICLES

(71) Applicant: General Electric Company, Schenectady, NY (US)

(72) Inventors: Leonardo Ajdelsztajn, Niskayuna, NY (US); James Anthony Ruud, Delmar, NY (US); Dennis Michael Gray, Delanson, NY (US)

(73) Assignee: General Electric Company, Niskayuna, NY (US)

( * ) Notice: Subject to any disclaimer, the term of this patent is extended or adjusted under 35 U.S.C. 154(b) by 243 days.

(21) Appl. No.: 14/194,880

(22) Filed: Mar. 3, 2014

(65) Prior Publication Data

US 2014/0175318 A1  Jun. 26, 2014

Related U.S. Application Data

(62) Division of application No. 13/298,326, filed on Nov. 17, 2011, now abandoned.

(51) Int. Cl.
*C23C 4/129* (2016.01)
*F16K 3/30* (2006.01)
(Continued)

(52) U.S. Cl.
CPC ............... *C09D 1/00* (2013.01); *C23C 4/129* (2016.01); *C23C 24/04* (2013.01); *F16K 3/30* (2013.01); *Y10T 428/252* (2015.01)

(58) Field of Classification Search
CPC .. C09D 1/00; F16K 3/30; C23C 4/124; C23C 24/04; Y10T 428/252
(Continued)

(56) References Cited

U.S. PATENT DOCUMENTS 3,276,867 A * 10/1966 Brite .................. C22C 1/051
376/261
3,713,816 A * 1/1973 MacCragh .......... C22C 32/0031
419/19
(Continued)

FOREIGN PATENT DOCUMENTS

EP    2390570 A2   11/2011
WO   9718341 A1    5/1997
(Continued)

OTHER PUBLICATIONS

Kuroda et al., "Warm spraying—a novel coating process based on high-velocity impact of solid particles", IOP Publishing, Science and Technology of Advanced Materials, (2008), Issue 9, vol. 033002, 17 pages.

(Continued)

*Primary Examiner* — John K Fristoe, Jr.
*Assistant Examiner* — Josephine Trinidad-Borges
(74) *Attorney, Agent, or Firm* — Paul J. DiConza

(57) ABSTRACT

One aspect of the present invention includes an article. The article includes a substrate and a coating disposed on the substrate, wherein the coating includes a plurality of cermet particles bonded along their prior particle boundaries. The plurality of cermet particles have a median particle size less than about 5 microns and less than 25 percent of the plurality of cermet particles include melted and re-solidified particles. Gate valves are also presented.

16 Claims, 9 Drawing Sheets

(51) Int. Cl.
*C23C 24/04* (2006.01)
*C09D 1/00* (2006.01)

(58) Field of Classification Search
USPC ........ 251/366, 368; 427/446, 450, 451, 453, 427/455, 456, 180, 190, 422; 75/235; 428/375, 376, 323
See application file for complete search history.

(56) References Cited

U.S. PATENT DOCUMENTS

| | | | | |
|---|---|---|---|---|
| 4,664,139 | A | * | 5/1987 | Pfeiffer .................... B01J 8/082 137/240 |
| 4,715,892 | A | * | 12/1987 | Mahulikar ................ C22C 1/05 257/E23.009 |
| 4,828,584 | A | * | 5/1989 | Cutler ................ C04B 35/5626 501/87 |
| 5,271,965 | A | | 12/1993 | Browning |
| 5,330,798 | A | | 7/1994 | Browning |
| 6,025,034 | A | | 2/2000 | Strutt et al. |
| 6,579,573 | B2 | | 6/2003 | Strutt et al. |
| 7,255,328 | B2 | * | 8/2007 | Hunter ...................... F16K 3/02 137/375 |
| 2003/0219544 | A1 | | 11/2003 | Smith et al. |
| 2007/0184253 | A1 | | 8/2007 | Mizuno et al. |
| 2008/0072790 | A1 | | 3/2008 | Ma et al. |
| 2008/0145554 | A1 | | 6/2008 | Ghasripoor et al. |
| 2008/0145649 | A1 | | 6/2008 | Mannem et al. |
| 2010/0266851 | A1 | | 10/2010 | Aton, III |
| 2011/0086178 | A1 | | 4/2011 | Ruud et al. |

FOREIGN PATENT DOCUMENTS

| | | |
|---|---|---|
| WO | 2008036887 A3 | 3/2008 |
| WO | 2009155702 A1 | 12/2009 |

OTHER PUBLICATIONS

Chivavibul et al., "Effect of Powder Characteristics on Properties of Warm-Sprayed WC-Co Coatings", ASM International, Journal of Thermal Spray Technology, Jan. 2010, vol. 19(1-2), pp. 81-88.

Kuroda et al., "Current Status and Future Prospects of Warm Spray Technology", ASM International, Journal of Thermal Spray Technology, Jun. 2011, vol. 20(4), pp. 653-676.

Search Report and Written Opinion from corresponding PCT Application No. PCT/US2012/052964 dated Nov. 23, 2012, 10 Pages.

* cited by examiner

COATING METHODS AND COATED ARTICLES

CROSS-REFERENCE TO RELATED APPLICATIONS

This application is a divisional of application Ser. No. 13/298,326 filed on Nov. 17, 2011, the entire contents of which are hereby incorporated by reference.

STATEMENT REGARDING FEDERALLY SPONSORED RESEARCH & DEVELOPMENT

This invention was made with Government support under contract number 70NANB7H7009 awarded by the National Institute of Standards and Technology. The Government has certain rights in the invention.

BACKGROUND

The invention generally relates to coating methods and coated articles. More particularly, the invention relates to combustion-based thermal spray coating methods and coated articles.

Cermet coatings may be used in various components to impart wear resistance. A thermal spray process may be used to produce cermet coatings through particle melting or partial melting, and acceleration of particles onto a substrate. Typical thermal spray coatings are produced by melting of the particles and re-solidification on the substrate. In this process, a feedstock material is heated to an elevated temperature in a spray device and the heated feedstock material is ejected from the spray device at a high velocity and thence sprayed against a substrate article surface. The droplets and particles impact the surface at a high velocity, and are flattened against the surface to form a solidified coating having a desired thickness.

Thermal spray processes often use combustion of fuel with an oxidizer to provide the heat to the feedstock material. Two combustion thermal spray processes, high velocity oxygen fuel (HVOF) and high velocity air fuel (HVAF) techniques, are sometimes used to form coatings. In each technique, a gas or liquid fuel is combusted with oxygen (HVOF) or air (HVAF) to produce a high velocity exhaust stream. A feedstock powder injected into the exhaust stream is heated and accelerated toward the desired substrate at sonic or supersonic speeds.

However, feedstock particles having an average diameter smaller than about 15-20 microns tend to clog or agglomerate in conventional HVOF and HVAF equipment, affecting the feeding rate and the quality of the coating. Further, the HVOF or the HVAF process, by the nature of combustion process, may produce very high combustion temperatures that result in high particle temperatures that could lead to oxidation, decarburization, or dissolution of the ceramic particles in the metallic binder matrix, which may affect the properties of the coatings.

Thus, there is a need for improved methods of depositing cermet coatings using the thermal spray process. Further, there is a need for cost-effective coatings having the desired properties and deposited using the combustion-based thermal spray process.

BRIEF DESCRIPTION OF THE INVENTION

Embodiments of the present invention are provided to meet these and other needs. One embodiment is a method. The method includes combusting a fuel and an oxidant in a combustion chamber of a thermal spray gun to form a combustion stream. The method further includes injecting a liquid and a feedstock material into the combustion stream in the combustion chamber to form an entrained feedstock stream, wherein the feedstock material includes a plurality of cermet particles having a median particle size of less than about 5 microns. The method further includes directing the entrained feedstock stream on a surface of a substrate to form a coating, wherein a temperature of the plurality of cermet particles in the entrained feedstock stream is less than a melting temperature of the plurality of cermet particles.

One embodiment is a method. The method includes combusting a fuel and an oxidant in a combustion chamber of a thermal spray gun to form a combustion stream. The method further includes injecting a liquid into the combustion stream in the combustion chamber through an outer tube of a coaxial injection port disposed in the thermal spray gun. The method further includes injecting a feedstock material into the combustion stream in the combustion chamber through an inner tube of a coaxial injection port disposed in the thermal spray gun to form an entrained feedstock stream, wherein the feedstock includes a plurality of cermet particles having a median particle size of less than about 5 microns. The method further includes directing the entrained feedstock stream on a surface of a substrate to form a coating, wherein a temperature of the plurality of cermet particles in the entrained feedstock stream is less than a melting temperature of the plurality of cermet particles.

One embodiment is an article. The article includes a substrate and a coating disposed on the substrate, wherein the coating includes a plurality of cermet particles bonded along their prior particle boundaries. The plurality of cermet particles have a median particle size less than about 5 microns and less than 25 percent of the plurality of cermet particles include melted and re-solidified particles.

One embodiment is a gate valve. The gate valve includes a first component; a second component; and a hermetic coating interposed between the first component and the second component. The coating includes a plurality of cermet particles bonded along their prior particle boundaries, wherein the plurality of cermet particles have a median particle size less than about 5 microns, and wherein less than 25 percent of the plurality of cermet particles include melted and re-solidified particles.

DRAWINGS

These and other features, aspects, and advantages of the present invention will become better understood when the following detailed description is read with reference to the accompanying drawings, wherein.

DETAILED DESCRIPTION

Figure 1:
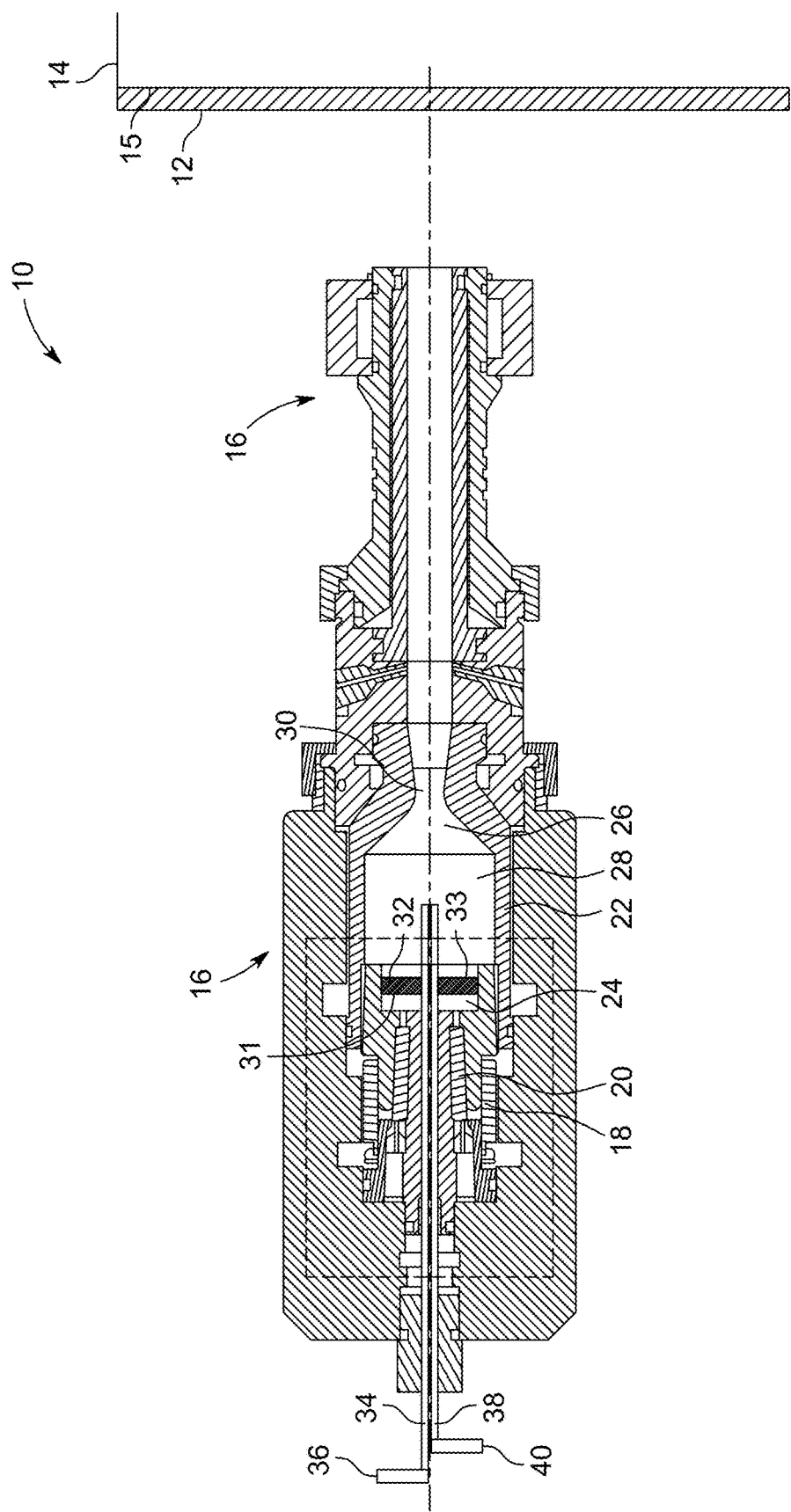
FIG. 1 illustrates an apparatus for fabricating a coating according to an embodiment of the invention.

As discussed in detail below, some of the embodiments of the invention include methods of forming cermet coatings using combustion-based thermal spray process. Further, some embodiments of the invention include articles including cermet coatings.

As noted earlier, typical combustion-based thermal spraying of cermet coatings may result in decarburization or oxidation of the cermet particles during the melting and/or partially melting and re-solidification steps. Further, the morphology and shape of the deposited cermet particles deposited using the typical combustion-based thermal spray process may vary from the morphology and shape of the feedstock particles because of the melting and/or partial melting and re-solidification of the particles. Thus, it may be desirable to fabricate coatings using combustion-based thermal spray process wherein the cermet particles are not subjected to the melting and re-solidification steps.

Typical methods of cooling the feedstock particles to preclude melting include addition of an external coolant, such as, an inert gas (for example, nitrogen) into the combustion zone (upstream of the nozzle) or addition of a liquid (for example, water) into the combustion gases downstream of the nozzle to cool the combustion gases. However, addition of nitrogen into the combustion zone may result in formation of impure combustion gases including water vapor, unreacted hydrocarbon and oxygen. Further, addition of an external coolant essentially results in cooling of the combustion gases to temperatures lower than the melting temperature of the feedstock material, which may affect the acceleration and impact velocity of the feedstock particles.

It has been unexpectedly discovered that by injecting the feedstock and the liquid into the combustion zone (upstream of the nozzle) of the thermal spray gun, substantial melting of the particles in the combustion stream may be precluded. Without being bound by any theory, it is believed that the liquid injected along with the feedstock into the combustion zone may provide a thermal barrier to the feedstock particles within the combustion stream and thus shield the particles from the high temperatures of the combustion gases in the combustion stream.

Further, in typical combustion-based thermal spray process, the coatings include a plurality of lamellae called 'splats', formed by flattening of the liquid or and/or partially melted droplets. As the feedstock powder used in typical combustion-based thermal spray process typically have sizes from 10 micrometers to above 100 micrometers, the lamellae have thickness in the micrometer range and lateral dimension from several to hundreds of micrometers. Between these lamellae, there are often small voids, such as pores, cracks and regions of incomplete bonding, which may lead to properties different from bulk materials. Thus, it may be desirable to form coatings using finer feedstock particles. In typical thermal spray processes, feedstock powders have been introduced to the thermal spray flame using gas as the carrier of the feedstock powders. Fine powder feedstocks, however, are very difficult to supply at a constant feed rate when gas is used as the carrier, particularly when their sizes are below 10 micrometers (μm).

It has been unexpectedly discovered that manipulating the feedstock particle size in less than 5 microns range, and by injecting the feedstock particles along with the liquid into the combustion zone, enables deposition of coatings that retain characteristics of the thermally sprayed particles. Without being bound by any theory, it is further believed that injecting the feedstock into the combustion zone along with the liquid may further provide for improved homogeneity of particles and also allow for greater acceleration of the feedstock particles.

Embodiments of the present invention include methods for fabrication of cermet coatings, wherein a substantial portion of the cermet particles are not subjected to the melting or partial melting and re-solidification steps. Further, some embodiments of the present invention include methods for producing fine-grained, dense, cermet coatings on a substrate using combustion-based thermal spray process by injecting fine (less than 5 microns) feedstock particles and a liquid into the combustion stream. Furthermore some embodiments of the present invention include articles including fine-grained, dense, cermet coatings, wherein the coatings include a small amount (less than 25%) of melted and re-solidified particles.

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In some instances, the approximating language may correspond to the precision of an instrument for measuring the value.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Figure 2:
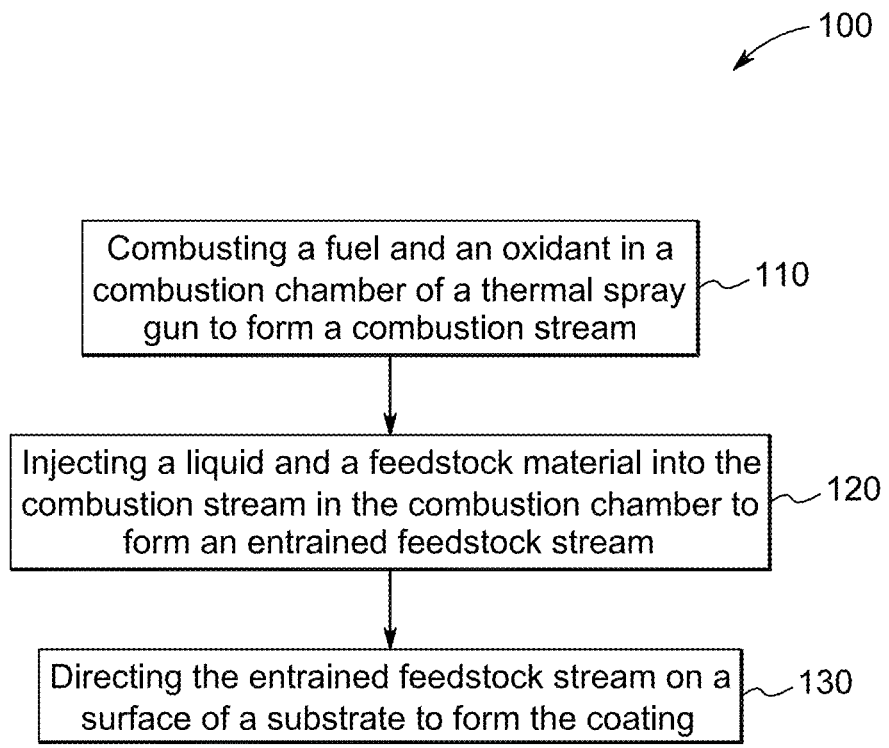
FIG. 2 is a flow chart for a method for fabricating a coating according to an embodiment of the invention.

One embodiment includes a method 100 of forming a coating on a substrate. In one embodiment, the method 100 includes forming a coating 12 on a surface 15 of a substrate 14 using an apparatus 10, as shown in FIGS. 1 and 2. FIG. 1 shows a simplified diagram of an exemplary apparatus 10 including a thermal spray gun 16 for forming a coating 12 on a substrate 14, according to one embodiment of the invention. The apparatus 10 may include any suitable spray gun, including, for example, high velocity air fuel (HVAF) or high velocity oxygen fuel (HVOF) gun. Although various spray guns are known in the art and may be used within the scope of various embodiments of the present invention, the exemplary spray gun 16 shown in FIG. 1 includes a plurality of circumferentially spaced oxidizer injection ports 18 and fuel injection ports 20 that feed an oxidant and a fuel (gas or liquid) respectively, to a combustion chamber 22. The spray gun 16 ignites the fuel/oxidizer mixture in the combustion chamber 22 that has an inlet side 24 and an outlet side 26. A combustion zone 28 exists between the inlet side 24 and the outlet side 26 of the combustion chamber 22. A nozzle 30 is further disposed in the outlet side 26 of the combustion chamber 22 and the nozzle 30 accelerates the combustion gases generated in the combustion chamber 22 to high velocities.

In some embodiments, the method 100 further includes providing a fuel via the fuel injection port 20 into the combustion chamber 22. In some embodiments, the method 100 further includes providing an oxidant via the oxidant injection port 18 into the combustion chamber 22. The fuel and the oxidant may be injected into the combustion chamber 22 simultaneously or sequentially.

Referring to FIGS. 1 and 2, in one embodiment, the method 100 includes, at step 110, combusting a fuel and an oxidant in the combustion chamber 22 of a thermal spray gun 16 to form a combustion stream. The term "combustion stream" as used herein refers to a mixture of gases produced as a result of combustion of fuel and oxidant in the combustion chamber 22. In some embodiments, a feedstock material may be transported by the combustion gases of the combustion stream to form a coating 12 on a surface 15 of the substrate 14.

In one embodiment, the oxidant includes oxygen, air, or combinations thereof. In one embodiment, non-limiting examples of fuel include a hydrocarbon, a carbonaceous material, an alcohol, or combinations thereof. In one embodiment, non-limiting specific examples of the fuel include propylene, propane, methane, butane, natural gas, hydrogen, kerosene, or combinations thereof.

In one embodiment, the method 100 further includes providing a permeable burner block 32 in the combustion zone 28 and initiating the combustion in the combustion zone after providing the fuel and the oxidizer to the combustion zone. Referring now to FIG. 1, the combustion chamber 22 in the thermal spray gun 16 further includes a permeable burner block 32, with an upstream face 31 and downstream face 33, disposed in the combustion chamber 22. In one embodiment, the permeable burner block 32 is disposed in the combustion zone 28 of the combustion chamber. In one embodiment, the permeable burner block 32 includes a plurality of orifices (not shown) that help in transporting the fuel for efficient combustion in the combustion zone 28. In one embodiment, the permeable burner block 32 includes a ceramic material. In one embodiment, the permeable burner block 32 includes a catalytic plate.

Without being bound by any theory, it is believed that the permeable burner block 32 receives the fuel from the fuel injection port 20 and helps in efficient combustion of the fuel to create high velocity combustion gases in the combustion stream. Without being bound by any theory, it is further believed that the high velocity combustion gases may advantageously provide for lower temperature combustion gases to heat and accelerate the particles. Thus, in some embodiments, the high velocity combustion gases generated via the permeable block 32 may advantageously allow for bonding of the coating 12 to the substrate 14, without significant splashing or sputtering.

Referring again to FIGS. 1 and 2, in one embodiment, the method 100 further includes, at step 120, injecting a liquid and a feedstock material into the combustion stream in the combustion chamber 22 to form an entrained feedstock stream. In some embodiments, the liquid and the feedstock material are injected into the combustion zone 28 of the combustion chamber 22 of the thermal spray gun. In particular embodiments, the liquid and the feedstock material are injected into the combustion gases of the combustion stream present in the combustion zone 28 of the thermal spray gun 16.

In one embodiment, the liquid is injected into the combustion chamber 26 via a liquid injection port 34 and the feedstock material is injected into the combustion chamber 22 via a feedstock injection port 38, as indicated in FIG. 1. In such embodiments, the liquid and the feedstock material are co-injected into the combustion chamber 22 through the liquid injection port 34 and the feedstock injection port 38, respectively.

As indicated in FIG. 1, in one embodiment, the thermal spray gun 16 further includes a liquid injection port 34 connected to a source of liquid 36 and disposed in the combustion chamber through the inlet side 24. The liquid injection port 34 may be placed circumferentially, axially or at an oblique angle to the nozzle 30. In one embodiment, the liquid injection port 34 is placed axially in the thermal spray gun 16. In another embodiment, as shown in FIG. 1, the thermal spray gun 16 includes the liquid injection port 34 in the centerline axis of the combustion chamber 22. The liquid injection port 34 supplies a liquid material that disperses the feedstock material that gets injected into the stream of combustion gases in the spray gun 16 to overcome the difficulties experienced with supplying small-sized particles in conventional coating apparatus, in some embodiments.

In one embodiment, the thermal spray gun 16 further includes a feedstock injection port 38 connected to a feedstock source 40. The feedstock injection port 38 may be placed circumferentially, axially or at an oblique angle to the combustion chamber 22. In one embodiment, as shown in FIG. 1, the thermal spray gun 16 includes a feedstock injection port 38 disposed axially to the combustion chamber 22. In one embodiment, the feedstock injection port 38 supplies the feedstock material into the flow of combustion gases. The combustion gases accelerate the feedstock material and the feedstock material exits the thermal spray gun 16 to produce the coating 12 on the substrate 14.

In another embodiment, the feedstock material is mixed with the liquid to form a feedstock mixture prior to injecting the liquid and the feedstock material into the combustion chamber 22. In some embodiments, the feedstock material may be mixed with the liquid to form a suspension, a slurry, a colloidal dispersion, a solution, or combinations thereof. In such embodiments, the thermal spray gun may only have one injection port, such as, for example, the liquid injection port 34 for injecting the feedstock and the liquid into the combustion stream. Further, in such embodiments, the method 100 includes, at step 120, injecting the liquid and the feedstock material into the combustion chamber 22 as a feedstock mixture through the liquid injection port 34.

Depending, in part, on one or more of the feedstock material, fuel, temperature of combustion, and the velocity of the combustion stream, along with other variables, the location of the tip of the liquid injection port 34 that introduces the liquid or the feedstock mixture to the combustion stream may vary. In one embodiment, the liquid injection port 34 may extend up to the downstream face 33 of the permeable burner block 32. In yet another embodiment, the liquid injection port 34 may extend through the combustion zone 28 into the nozzle 30. In a particular embodiment, as indicated in FIG. 1, the liquid injection port 34 may extend into the combustion zone 28 between the permeable burner block 32 and the nozzle 30.

As noted earlier, in particular embodiments, the tip of the liquid injection port 34 essentially extends upstream of the nozzle 30, such that the liquid or the feedstock mixture is injected into the combustion stream prior to the discharge of the combustion stream from the nozzle 30. Similarly, in embodiments including a separate feedstock injection port 38, the tip of the feedstock injection port 38 essentially extends upstream of the nozzle 30, such that the feedstock material is injected into the combustion stream prior to the discharge of the combustion stream from the nozzle 30.

Without being bound by any theory, it is believed that injection of the feedstock material and the liquid into the combustion zone may provide for improved homogeneity of particles and also allow for greater acceleration of the feedstock particles.

Figure 3:
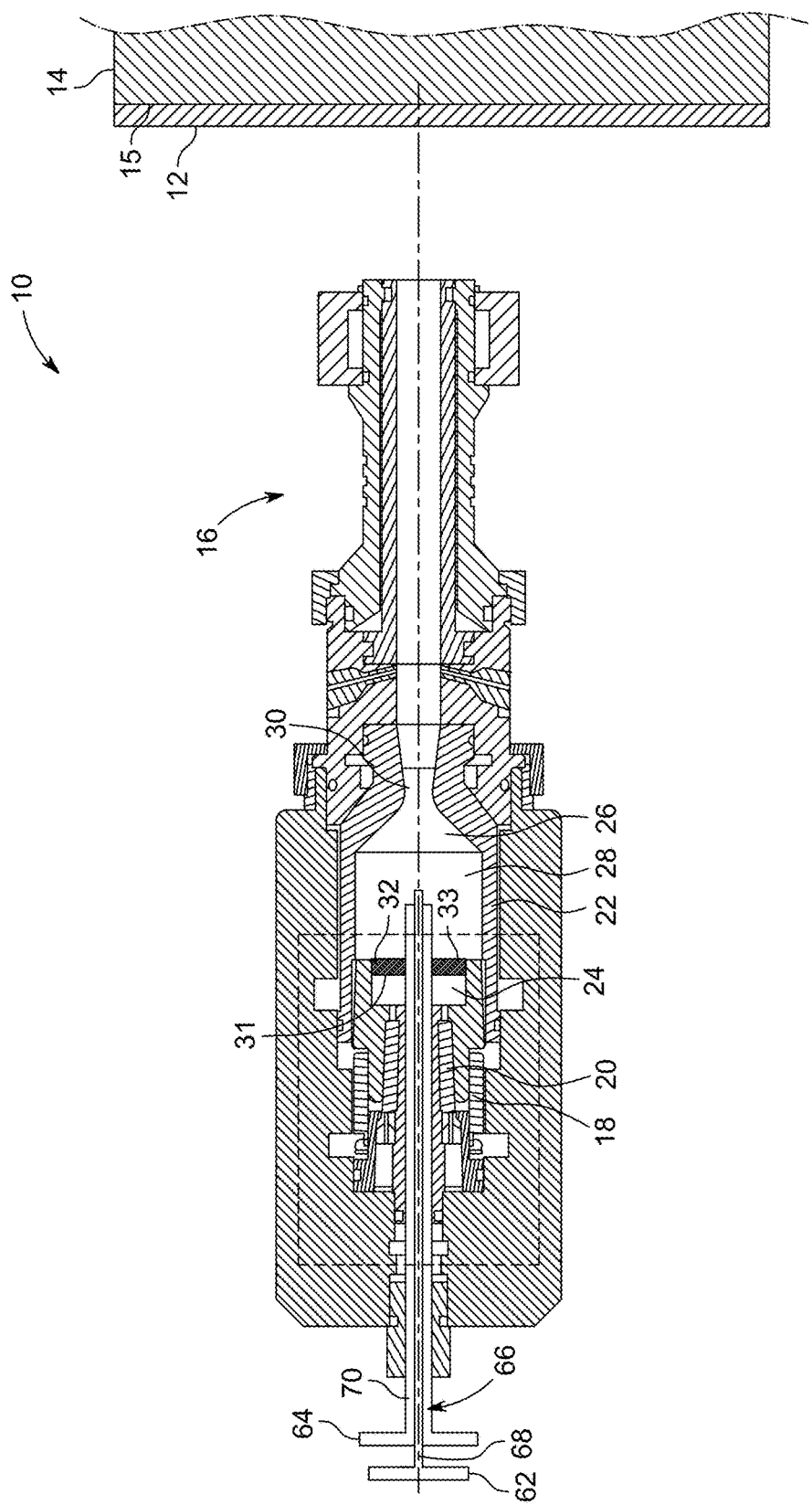
FIG. 3 illustrates an apparatus for fabricating a coating according to an embodiment of the invention.

In yet another embodiment, the method 100 includes injecting the liquid and the feedstock into the combustion chamber 22, at step 120, through a coaxial injection port 66, as indicated in FIG. 3. As shown in FIG. 3, in one embodiment, a coaxial tube injection port 66 including an inner tube 68 and an outer tube 70 is disposed in the inlet side of the combustion chamber 22. In one embodiment, the coaxial injection port 66 is connected to both the source of feedstock material 62 and the source of liquid 64. In one embodiment, the inner tube 68 of the coaxial injection port 66 is connected to the source of liquid 64 and the outer tube 70 is connected to the source of feedstock material 62. In an alternate embodiment, the inner tube 68 of the coaxial injection port 66 is connected to the source of feedstock material 62 and the outer tube 70 is connected to the source of liquid 64.

In particular embodiments, the method 100 includes, at step 120, injecting the feedstock material into the combustion stream through the inner tube 68 of the coaxial injection port 66. In some embodiments, the feedstock material is transported into the combustion stream along with a carrier, such as, for example, gas and air, through the inner tube 68 of the coaxial injection port 66. In some embodiments, the method 100 further includes, at step 120, injecting the liquid into the combustion stream through the outer tube 70 of the coaxial injection port 66. In some embodiments, the liquid and the feedstock material may be injected into the combustion stream sequentially. In alternate embodiments, the liquid and the feedstock material may be injected into the combustion stream simultaneously.

In one embodiment, the coaxial injection port 66 may include a plurality of coaxial tubes to inject the liquid and the feedstock material into the combustion stream. In one embodiment, the apparatus 10 may include a plurality of coaxial injection ports 66 to inject the liquid and the feedstock material into the combustion stream.

Without being bound by any theory, it is believed that injection of the liquid along with the feedstock material may provide thermal shielding of the plurality of the cermet particles from the hot combustion gases in the combustion stream, in some embodiments. In some embodiments, the method further includes injecting the liquid in an amount sufficient to provide a thermal barrier for the plurality of cermet particles in the entrained feedstock stream. The amount sufficient to provide the thermal barrier may be determined by one or more of the cermet material, the type of fuel, the temperatures generated within the thermal spray gun, and the design of the thermal spray gun.

In embodiments including injection of a feedstock mixture including the liquid and the feedstock material, the plurality of cermet particles may be present in the feedstock mixture at a concentration in a range from about 1 weight percent to about 50 weight percent of the feedstock mixture. In some embodiments, the plurality of cermet particles may be present in the feedstock mixture at a concentration in a range from about 5 weight percent to about 25 weight percent of the feedstock mixture.

Non limiting examples of liquids for injecting into the combustion stream include water, alcohol, an organic combustible liquid, an organic incombustible liquid, or combinations thereof. Specific non-limiting examples of liquids for injecting into the combustion stream include water, ethanol, methanol, isopropanol, butanol, hexane, ethylene glycol, glycerol or combinations thereof.

As noted earlier, the feedstock material includes a plurality of cermet particles. The term "cermet" as used herein refers to a composite material including a ceramic phase and a metallic phase. Non-limiting examples of suitable metal for use in the metallic phase of the cermet particles include, but are not limited to, aluminum (Al), cobalt (Co), nickel (Ni), iron (Fe), molybdenum (Mo), chromium (Cr), and combinations including at least one of the foregoing metals. Non-limiting examples of suitable ceramics for use in the ceramic phase of the cermet particles include, but are not limited to, carbides such as tungsten carbide (WC), titanium carbide (TiC), vanadium carbide (VC), chromium carbide ($Cr_3C_2$), tantalum carbide (TaC), and silicon carbide (SiC); nitrides such as aluminum nitride (AlN), silicon nitride ($Si_3N_4$), and zirconium nitride (ZrN); borides such as titanium diboride ($TiB_2$) and zirconium boride, and combinations including at least one of the foregoing materials.

Feedstock materials having different particle sizes may be used in the methods of making coatings presented herein to form strong and dense coatings. Without being bound by any theory, it is believed that use of a liquid carrier and the thermal barrier effect provided by the liquid may advantageously allow for much finer feedstock particles than that of the feedstock particles used in a typical thermal spray method for deposition of coatings.

In one embodiment, a median particle size of the plurality of cermet particles is less than about 10 microns. In one embodiment, a median particle size of the plurality of cermet particles is less than about 5 microns. In a further embodiment, a median particle size of the plurality of cermet particles is in a range from about 100 nanometers to about 5 microns. In a particular embodiment, a median particle size of the plurality of cermet particles is in a range from about 500 nanometers to about 3 microns.

Without being bound by any theory, it is believed that the introduction of fine particles (less than about 5 microns) may increase the particle flight velocity, which may reduce the dwell time in the flame and also allow for fabrication of coatings with fine particle size. In some embodiments, the reduced median particle size of the plurality of cermet particles may allow the method 100 to produce a coating 12 including a plurality of bonded particles having a median particle size less than about 10 microns. In some further embodiments, the reduced median particle size of the plurality of cermet particles may allow the method 100 to produce a coating 12 including a plurality of bonded particles having a median particle size less than about 5 microns.

In one embodiment, as described earlier, a temperature of the plurality of cermet particles in the entrained feedstock stream is less than a melting temperature of the plurality of cermet particles. In a further embodiment, the temperature experienced by the plurality of cermet particles is less than about 0.9 times a melting temperature of the plurality of cermet particles. In some embodiments, the feedstock material is substantially unmelted in the entrained feedstock stream. In some embodiments, the feedstock material is substantially unmelted during the step of directing the feedstock stream on the surface 15 of the substrate to form the coating 12. The term "substantially unmelted" as used herein means that less than about 25 percent of the plurality of cermet particles are unmelted. In some embodiments, less than about 5 percent of the plurality of cermet particles are unmelted.

In one embodiment, the methods of coating by combustion-based thermal spray presented here may be different from the conventional combustion-based thermal spray methods used to form coatings. As described earlier, a conventional thermal spray process fabricates the cermet coating through particle melting or partial melting and accelerating onto a substrate. Further, some conventional combustion thermal spray methods use an external coolant to cool the combustion gases such that the gases are cooled to temperatures lower than the melting point of the particles.

In contrast, in some embodiments of the methods presented here, the liquid injected along with the feedstock into the combustion zone may provide a thermal barrier to the feedstock particles within the combustion stream and thus shield the particles from the high temperatures of the combustion stream. Further, in some embodiments, injection of the feedstock material and the liquid through the coaxial injection port may allow for further shielding of the plurality of cermet particles in the combustion zone by the liquid. Furthermore, in contrast to the conventional cooling methods of combustion-based thermal spray process, the combustion gases in the combustion stream may be at temperatures greater than the melting temperature of the feedstock particles, and thus have higher velocities.

In one embodiment, the methods of coating by combustion-based thermal spray presented here may be different from the conventional cold spray methods used to form coatings. In conventional cold spray process, a carrier gas is heated by external electrical heating and is accelerated by high pressures, while in some embodiments of the present invention, the carrier gas is heated by the chemical reaction during combustion and is accelerated using expansion of the combustion by-product. Further, in the conventional cold spray process, the carrier gas is typically maintained below the melting temperature of the particles. In contrast, in some embodiments of the invention, the combustion gases are heated above the melting temperature of the particles, but the liquid injected along with the feedstock material maintains the temperature of the plurality of cermet particles below their melting point.

Without being bound by any theory, it is believed that in some embodiments, a liquid injected along with the feedstock material may advantageously enable generation of high velocity, hot feedstock particles that do not melt and further form dense coatings including bonded particles. Further, in some embodiments, the methods as presented here, by precluding melting and re-solidification of the particles may advantageously reduce oxidation or decarburization of the cermet particles. Furthermore, in some embodiments, injection of the feedstock particles along with the liquid into the combustion zone may advantageously enable deposition of coatings that retain characteristics (size or shape) of the feedstock particles.

As noted earlier, the liquid and the feedstock are injected into the combustion stream to form an entrained feedstock stream. In one embodiment, the method 100, further includes, at step 114, directing the entrained feedstock stream on the surface 15 of the substrate 14 to form a coating 12 such that at least a part of the surface 15 of the substrate 12 is covered by the cermet coating 12, as indicated in FIGS. 1 and 2. In some embodiments, the entrained feedstock stream is expelled from the spray gun 16 through the nozzle 30 to form the coating 12. In particular embodiments, the entrained feedstock stream is sprayed on the surface 15 of the substrate 14 to form the coating 12.

In some embodiments, the substrate includes a material capable of withstanding the conditions of the thermal spray processes without structural degradation. Non-limiting examples of the substrate material include plastic, glass, glass ceramic, metal, metal alloy, ceramic, cermets, semiconductor, or combinations thereof.

In one embodiment, the substrate 14 may be pre-heated prior to the thermal spray process. In one embodiment, the surface 15 of the substrate 14 may be cleaned to improve adhesion between the substrate surface and the coating 12. For example, in some embodiments, the substrate 14 may be cleaned to remove any impurities such as undesirable oxide formation or presence of grease.

In one embodiment, the substrate 14 may be heat treated after the thermal spray process to form the coating 12. Any operable heat treatment such as, for example, annealing may be used. The heat treatment may cause the coating material to inter-diffuse to some degree with the substrate material.

In one embodiment, the substrate 14 may be a part of an apparatus or an article, where an existing coating has degraded and has to be repaired. In one embodiment, the coating 12 is used to replace claddings, to provide structural surface layers, or to form near-net shape components and features on components. The method of forming a coating, in accordance with embodiments of the present invention, may be used with a wide variety of compositions and substrate articles, yielding a variety of different types of properties. In one example, to build up an article that has been partially worn away during prior service, the coating 12 may include the same composition as the substrate article 14. In another example, to provide a wear-resistant coating at the surface 15, the coating 12 may have a different composition than the substrate article 14 and may be more wear resistant than the substrate article 14. In yet another example, to provide a wearing or abradable coating at the surface 15, the coating may have a different composition than the substrate article 14 and may be less wear resistant than the substrate article 14. In a particular embodiment, the substrate 14 may be a part of an apparatus or an article including a wear resistant coating.

Figure 4:
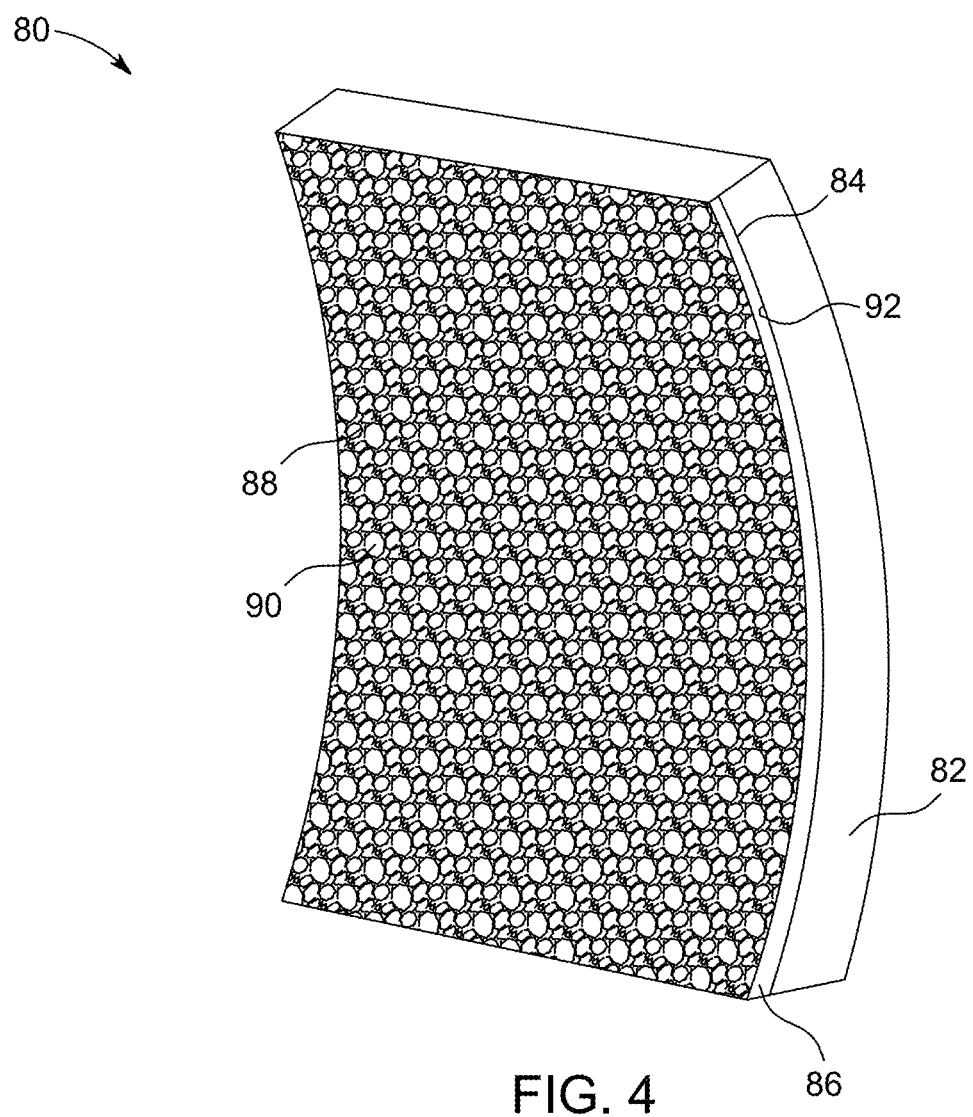
FIG. 4 illustrates an article with a coating according to an embodiment of the invention.

In one embodiment of the invention, an article is presented. The article 80, as shown in FIG. 4, for example, is formed when a coating 86 is formed on a substrate 82 of the article 80, in accordance with the method described herein. In one embodiment, the substrate 82 includes a depositing surface 84. The coating 86 is formed on the depositing surface 84 of article 80. In one embodiment, the coating 86 includes a plurality of cermet particles 88 bonded along their prior particle boundaries 90. In one embodiment, a surface of contact between the coating material 86 and the depositing surface 84 of the substrate 82 is a bondline 92, as indicated in FIG. 4.

As noted earlier, in some embodiments, methods of the present invention may advantageously provide for high-velocity impact of the cermet particles on the substrate 82 to form a coating 86 that exhibits one or more of a fine splat size, a fine grain size, a high density, and a high bond strength to the underlying surface.

In one embodiment, the plurality of particles 88 bonded along their prior particle boundaries 90 in the coating 86 have a median particle size less than about 10 microns. In one embodiment, the plurality of particles 88 bonded along their prior particle boundaries 90 in the coating 86 have a median particle size less than about 5 microns. In one embodiment, the particles have a median particle size in a range from about 100 nanometers to about 5 microns. In a particular embodiment, the particles have a median particle size in a range from about 500 nanometers to about 3 microns.

Further as noted earlier, the methods of the present invention advantageously provide for deposition of the coating 86 on the substrate, wherein the plurality of cermet particles are not subjected to the melting and re-solidification steps that is a typical of a convention thermal spray process. Accordingly, in one embodiment, the article 80 includes a coating 86 including a plurality of cermet particles, wherein less than 25 percent of the plurality of cermet particles include melted and re-solidified particles. In one embodiment, the article 80 includes a coating 86 including a plurality of cermet particles, wherein less than 10 percent of the plurality of cermet particles include melted and re-solidified particles. In one embodiment, the article 80 includes a coating 86 including a plurality of cermet particles, wherein less than 5 percent of the plurality of cermet particles include melted and re-solidified particles. Without being bound by any theory, it is believed that a coating 86 including a lower amount of melted and re-solidified particles may provide for improved properties over conventionally processed coatings.

Further, in one embodiment, the methods of the present invention advantageously provide for deposition of a coating 86 that includes substantially non-deformed particles. In some embodiments, the plurality of bonded particles in the deposited coating 86 may be further characterized by the lamellae size or the splat size. The term "lamellae" as used herein refers to molten or semi-molten particles that have re-solidified in the coating to form deformed particles. In some embodiments, the term "lamellae" may be used interchangeably herein with "splat".

Without being bound by any theory, it is believed that as the plurality of the particles are not subjected to the melting and re-solidification steps, the bonded particles in the deposited coating 86 essentially maintain their original shape and size after the deposition step. In one embodiment, the plurality of bonded particles in the deposited coating may be further characterized by the aspect ratio of the bonded particles in the deposited coating 86. In one embodiment, at least 99% of the plurality of bonded cermet particles have an aspect ratio less than about 10. In a further embodiment, at least 99% of the plurality of bonded cermet particles have an aspect ratio less than about 5. In a particular embodiment, at least 99% of the plurality of bonded cermet particles have an aspect ratio in a range from about 1 to about 3. In some embodiments, low aspect ratio splats may promote stronger mechanical locking with smooth substrates, precluding the need for an aggressive surface preparation before thermal spraying. Further, in some embodiments, smaller splats may also provide smoother surface finish and denser microstructures in the coating.

In some embodiments, the coating 86 is substantially free of lamellae or splats. The term "substantially free" as used in this context means that less than about 5 percent of the plurality of bonded particles in the coating 86 include lamellae or splats. In some embodiments, that less than about 1 percent of the plurality of bonded particles in the coating 86 include lamellae or splats.

In one embodiment, the coating 86 has a density greater than about 95% of theoretical density of the coating material. In a further embodiment, the coating 86 has a density greater than about 99% of theoretical density of the coating material. In one embodiment, the coating 86 has a thickness in a range from about 100 nanometers to about 1000 microns. In a further embodiment, the coating 86 has a thickness in a range from about 1 micron to about 50 microns.

In some embodiments, the article 80 may be of any operable shape, size, and configuration. In some embodiments, the article 80 may include a component of a steam turbine, such as, a seal or a flange. In some embodiments, the article 80 may include a component of a steam turbine. In particular embodiments, the article 80 may include a gate valve used in oil and gas applications.

In one embodiment of the invention, a gate valve is presented. In some embodiments, a gate valve suitable for oil wells for petroleum and natural gas extraction is provided. In particular embodiments, a gate valve operable to allow or prevent flow of oil or gas in a subsea tree is presented.

Figure 5:
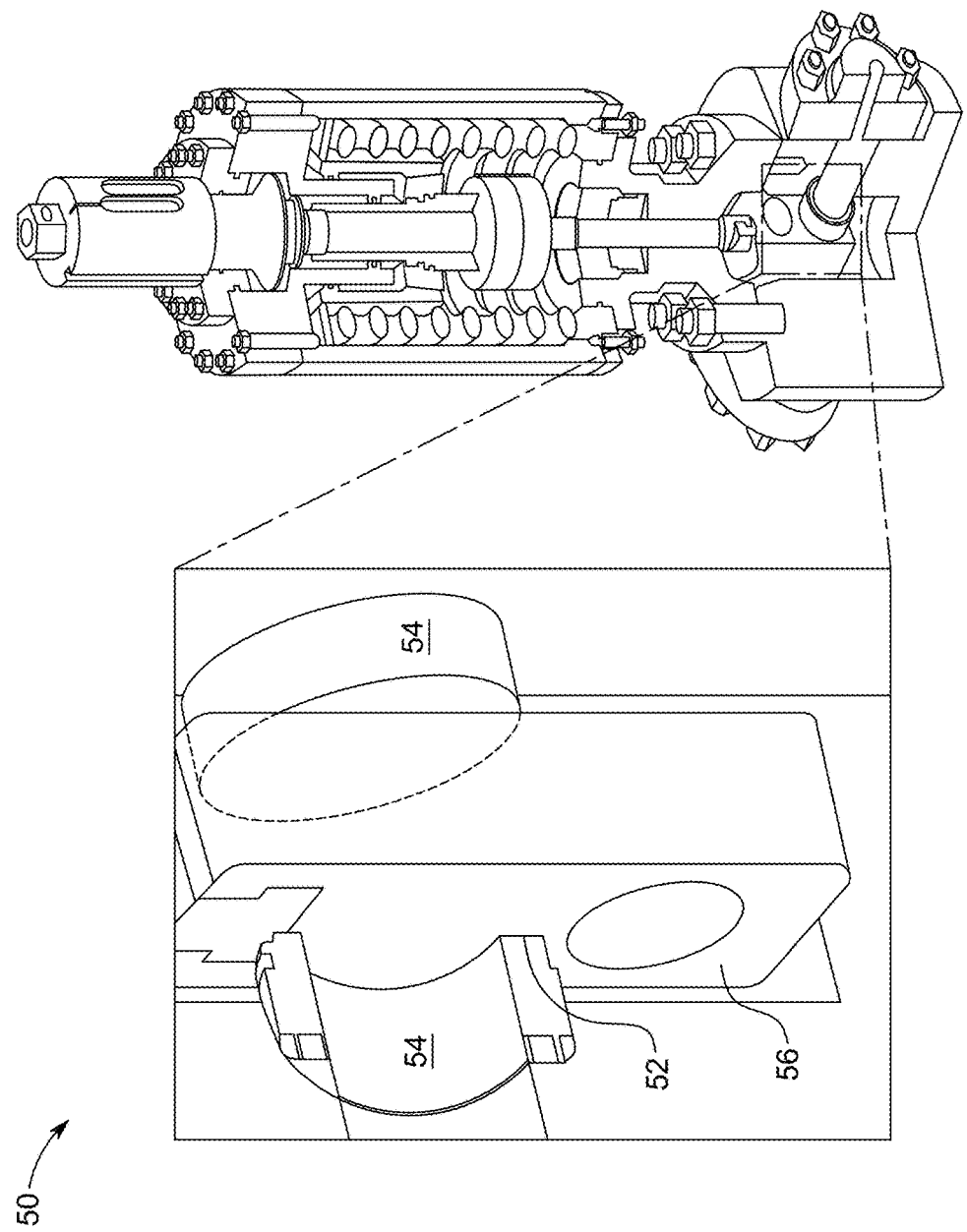
FIG. 5 illustrates a schematic of an oil and gas gate valve according to an embodiment of the invention.

FIG. 5 shows a schematic drawing of a gate valve for use in an oil and gas well. This Figure includes an enlarged view of a schematic drawing of a gate valve 50, according to one embodiment of the invention. As indicated in FIG. 5, in one embodiment, the gate valve 50 includes a first component 54 and a second component 56. In one embodiment, the first component 54 includes a seat and the second component includes a gate 56.

In one embodiment, a hermetic coating 52 is further interposed between the first component 54 and the second component 56. The term "hermetic coating" as used herein refers to a coating that has a permeability to helium less than about $1\times10^{-8}$ atm-cc/s. In one embodiment, the hermetic coating has a permeability to helium less than about $5\times10^{-9}$ atm-cc/s.

In some embodiments, the hermetic coating 12 includes a plurality of cermet particles bonded along their prior particle boundaries, as described earlier. In some embodiments, the plurality of cermet particles have a median particle size less than about 5 microns. In some embodiments, less than 25 percent of the plurality of cermet particles include melted and re-solidified particles, as described earlier. Without being bound by any theory, it is believed that the use of hermetic coating 12 including a plurality of bonded cermet particles as described herein may preclude the need for an additional polymeric sealant that is typically used in gate valves. In one embodiment, the hermetic coating 12 is free of a polymer sealant.

EXAMPLES

Example 1

Figure 6:
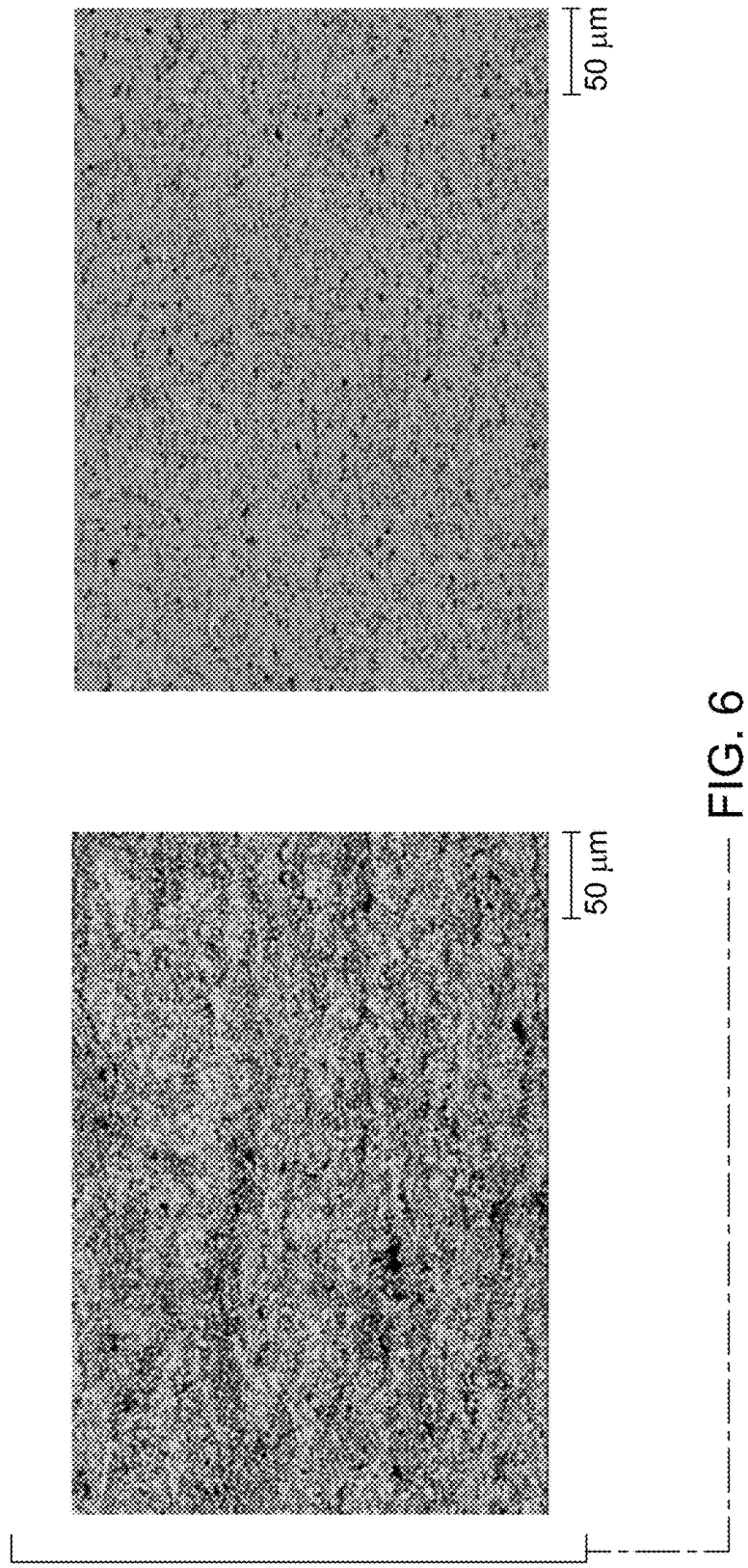
FIG. 6 illustrates cross-sectional scanning electron micrographs of coatings prepared using liquid injection and powder injection.

Coarse Powder HVAF Coating Versus Liquid Injection HVAF Coating Using Fine Particles Preparation of Coarse Powder HVAF Coating Amperit 558.059 Tungsten carbide/cobalt chromium (WC/CoCr) particles having a $d_{50}$ of about 20 microns were employed. The term "$d_{50}$" as used herein means that 50 percent of the particles have a particle size less than this value. The particles were fed as dry powder with a carrier gas into a Kermetico AK 07 HVAF thermal spray gun in order to produce a coating on a steel substrate. Propane fuel was supplied to the gun at 70 psig and air was supplied at 93 psig. The combustion pressure was adjusted to be about 55 psi. The gun was operated with a gun traversal speed of about 1 m/s at a spray distance of 16.25 cm from the substrate. The deposited coating (Comparative Sample 1) had a thickness of about 300 microns. FIG. 6 shows the cross-sectional scanning electron microscopy (SEM) images for Comparative Sample 1.

Preparation of Liquid Injection HVAF Coating

Tungsten carbide/cobalt chromium (WC/CoCr) particles having a $d_{50}$ of about 1.5 microns were combined with water to form a slurry with 10 wt % solids loading. The slurry was fed into a Kermetico AK-07 HVAF thermal spray gun. The gun was supplied with air at 98 psi and propylene at 73 psi to produce a combustion flame. The gun was rastered across a stainless steel block at 1200 mm/s at a distance of 3 inches to produce a coating (Sample 1) having a thickness of about 250 microns.

FIG. 6 shows the cross-sectional scanning electron microscopy (SEM) images for Comparative Sample 1 and Sample 1. As indicated in FIG. 6, liquid injection of particles (Sample 1) results in finer, denser and more uniform microstructure of the deposited coatings when compared to coatings prepared using coarse powder injection (Comparative Sample 1). Comparative Sample 1 shows a plurality of lamellae oriented with the long dimension in the plane of the coating. In contrast, Sample 1 shows a notable lack of lamellar features.

Example 2

Commercially Available Cermet Coatings Versus Liquid Injection HVAF Coating

Commercial coatings were used as comparative examples. Comparative Sample 2a is a commercially available tungsten-carbide-cobalt-chromium coating produced with a detonation gun process using dry powder with an average particle size greater than 10 microns [R. J. K. Wood, B. G. Mellor, M. L. Binfield, Wear Volume 211, (1997) 70-83]. Comparative Sample 2b is a tungsten-carbide-cobalt-chromium coating produced with JP5000 (Praxair, Inc.) HVOF equipment using dry powder with an average particle size greater than 10 microns.

Figure 7:
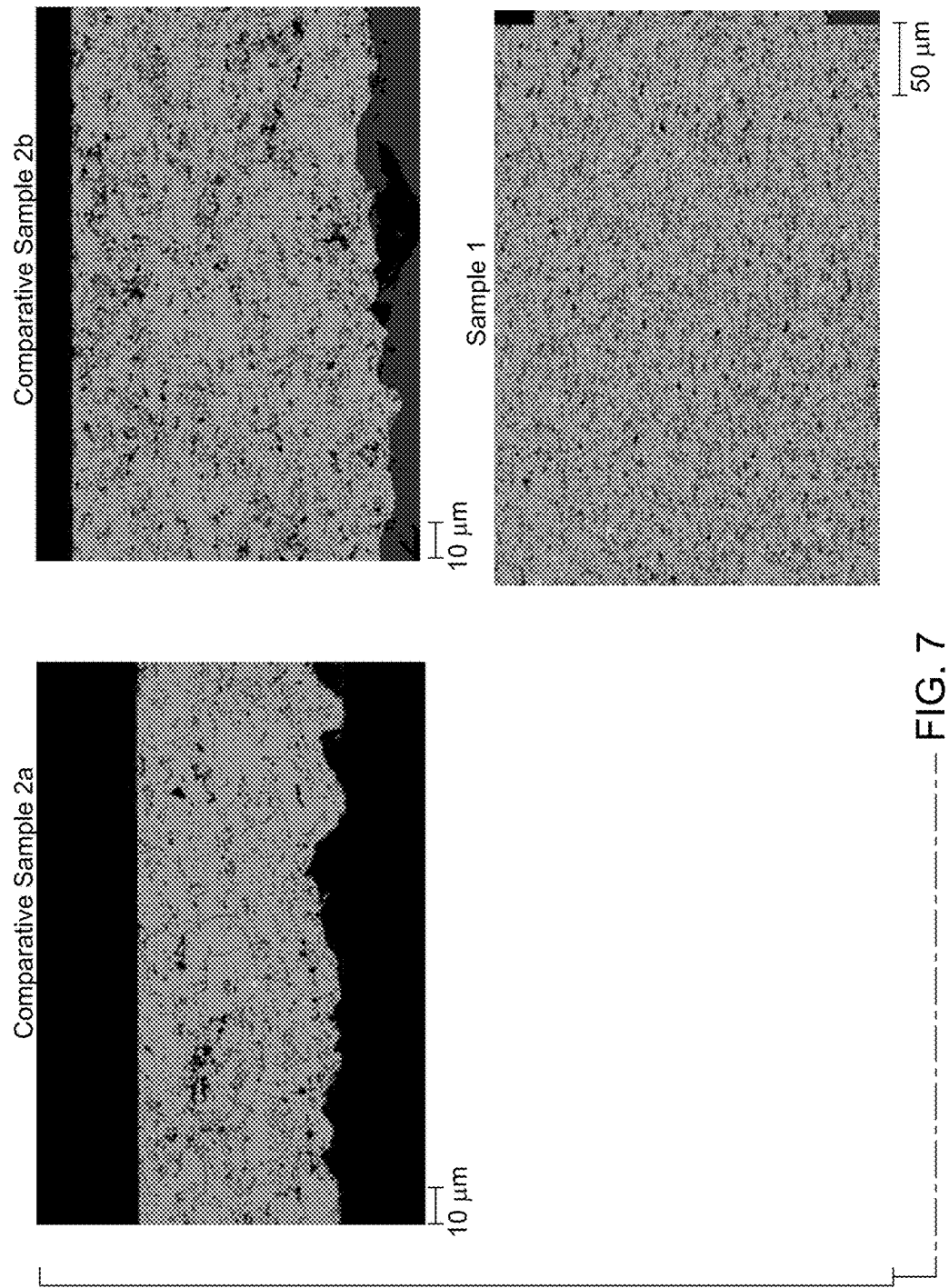
FIG. 7 illustrates cross-sectional scanning electron micrographs of various commercially available coatings and coating prepared using liquid injection.

FIG. 7 shows the cross-sectional scanning electron microscopy (SEM) images for Comparative Samples 2a, 2b, and Sample 1. The resultant SEMs in FIG. 7 showed finer, more uniform and denser microstructure for Sample 1 when compared to Comparative Samples 2a and 2b. Comparative Samples 2a and 2b have a plurality of lamellae with their long dimension oriented in the plane of the coating. Sample 1 shows a notable lack of lamellar features.

Example 3

Wear Testing of Comparative Samples Versus Liquid Injection HVAF Coating

The wear resistance of the coatings (Comparative Sample 1, Comparative Samples 2a-2b, and Sample 1) were evaluated in a reciprocating wear test. The coatings were provided on a steel block and ground to a surface finish of less than 8 micro-inches. All coatings were tested against a standard wear face in the form of a coated ring. The wear face was translated linearly in a cyclic manner with a bearing stress of 25 ksi. The coefficient of friction was monitored continuously, and failure was determined by a rapid increase in the coefficient of friction by greater than about 20% accompanied by a loss of coating material from the block face.

Figure 8:
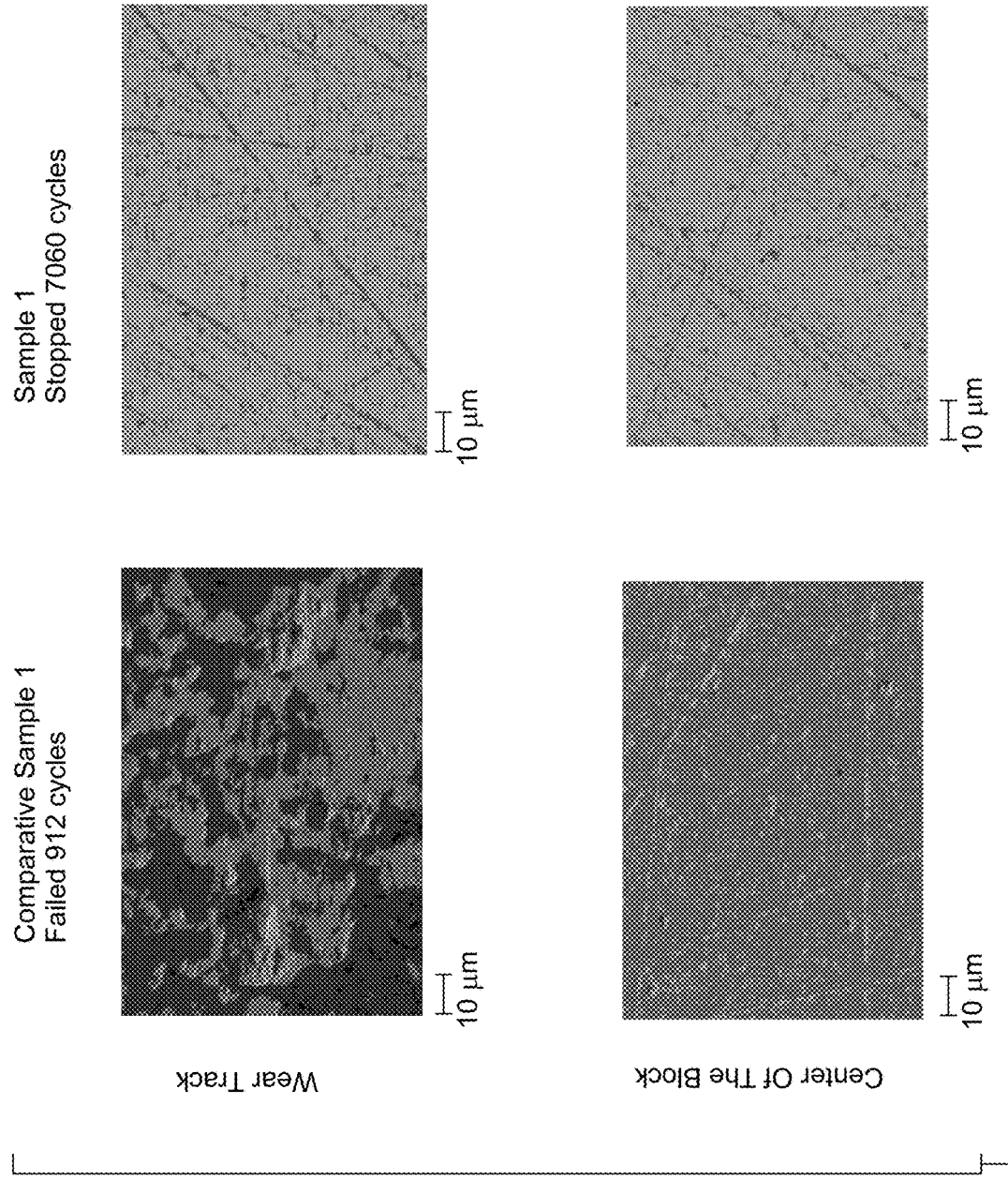
FIG. 8 illustrates wear resistance test results of coatings prepared using liquid injection and powder injection.
Figure 9:
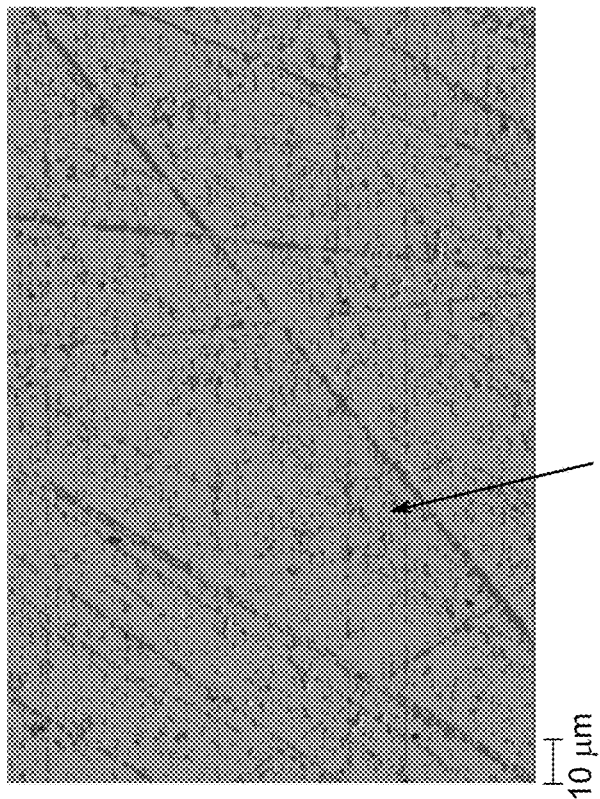
FIG. 9 illustrates wear resistance test results of coatings prepared using liquid injection and powder injection.
Figure 9:
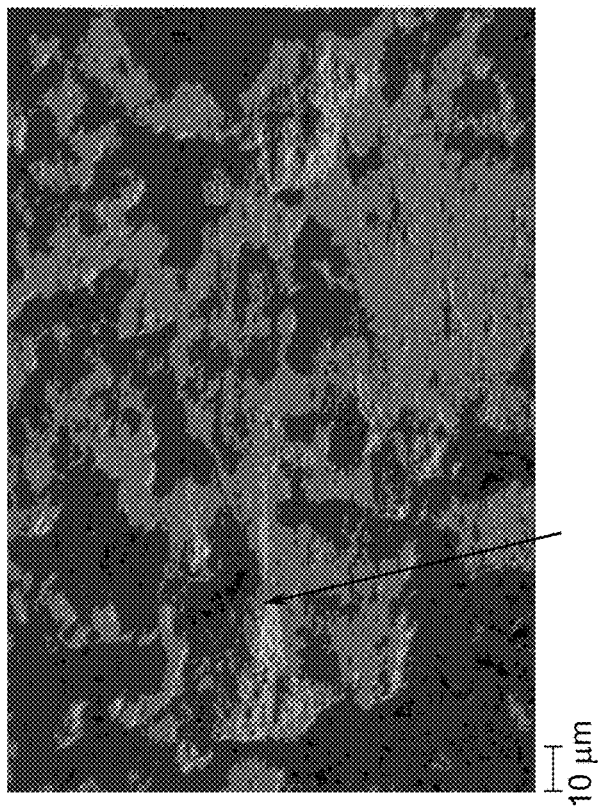

Comparative Sample 1 failed at 912 cycles. Comparative Sample 2a failed at 1028 cycles. Comparative Sample 2b failed at 1664 cycles. Sample 1 was tested for 7060 cycles without signs of failure and the test was stopped. FIGS. 8 and 9 show the wear test results for Comparative Sample 1 and Sample 1. FIG. 9 shows the enlarged images of wear test results of Comparative Sample 1 and Sample 1. As indicated by arrows in FIG. 9, wear tracks in Comparative Sample 1 show evidence of large pullout of material. Further, the dark areas in Comparative Sample 1 are deposits of smeared material from mating surface. In contrast, as indicated by arrows in FIG. 9, wear tracks in Sample 1 show evidence of deformation smaller than gridding/lapping marks. Further, Sample 1 did not show evidence of smeared material from the mating surface. With being bound by any theory, it is believed that the material that pulled out of the Comparative Sample 1 coating was of the same size scale as the particles used to deposit the coating and that the pulled out particles produced the progressive damage that led to failure. Sample 1, in contrast, was deposited using particles of a size smaller than the grinding marks, which if pulled out, did not result in significant wear damage.

Example 4

Helium Permeability Data for Liquid Injection HVAF Coating

The hermetic capability of liquid HVAF injection coatings (Sample 1) was tested by measuring the helium permeability. The samples were tested with a SIMS Helium Leak Detector (S/N: 10335) using the hard vacuum test port of the device. The metal blocks test surface were first wiped off with isopropyl alcohol so a clean, oil free surface existed. An epoxy was then applied to the KF25 end of a KF25 X KF40 vacuum flange adapter. That flange end was adhered to the cleaned test block surface. Slight pressure was applied to the adapter so that the epoxy made hermetic contact with the test block surface. The epoxy was allowed to cure for a minimum of 24 hours. Samples were placed on the test port of the detector and the vacuum cycle initiated. A plastic zip closure type bag was then placed over the block to fully encapsulate it. 100% helium gas was introduced inside the bag, and the open bag bottom was clamped off as much as possible. The test block remained under vacuum on the detector for a period of 15 minutes. Flow of helium continued throughout the minute equilibration period. A leak rate reading from the detector was then recorded.

The coatings (Sample 1) deposited using liquid HVAF injection showed helium permeability values lower than about $5\times10^{-9}$ atm-cc/s, thus indicating desired hermeticity.

The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present invention. As used in the claims, the word "includes" and its grammatical variants logically also subtend and include phrases of varying and differing extent such as for example, but not limited thereto, "consisting essentially of" and "consisting of:" Where necessary, ranges have been supplied; those ranges are inclusive of all subranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. An article, comprising:
a substrate and a coating disposed on the substrate,
wherein the coating comprises a plurality of cermet particles bonded along their prior particle boundaries, wherein the plurality of cermet particles have a median particle size less than 5 microns, and
wherein less than 25 percent of the plurality of cermet particles comprise melted and re-solidified particles.

2. The article of claim 1, wherein at least 99% of the plurality of cermet particles have an aspect ratio less than 5.

3. The article of claim 1, wherein the coating is substantially free of lamellae.

4. The article of claim 1, wherein the plurality of cermet particles comprise a ceramic phase comprising carbides, nitrides, or combinations thereof.

5. The article of claim 1, wherein the plurality of cermet particles comprise a metallic phase comprising cobalt, chromium, nickel, tungsten, or combinations thereof.

6. The article of claim 1, wherein a density of the coating is greater than 99 percent of the theoretical density.

7. The article of claim 1, wherein the coating is hermetic.

8. The article of claim 1, wherein the coating has a thickness in a range from 100 nanometers to 1000 microns.

9. A gate valve, comprising:
a first component;
a second component; and
a hermetic coating interposed between the first component and the second component, wherein the coating comprises a plurality of cermet particles bonded along their prior particle boundaries, wherein the plurality of cermet particles have a median particle size less than 5 microns,
wherein less than 25 percent of the plurality of cermet particles comprise melted and re-solidified particles.

10. The gate valve of claim 9, wherein at least 99% of the plurality of cermet particles have an aspect ratio less than 5.

11. The gate valve of claim 9, wherein the coating is substantially free of lamellae.

12. The gate valve of claim 9, wherein the plurality of cermet particles comprise a ceramic phase comprising carbides, nitrides, or combinations thereof.

13. The gate valve of claim 9, wherein the plurality of cermet particles comprise a metallic phase comprising cobalt, chromium, nickel, tungsten, or combinations thereof.

14. The gate valve of claim 9, wherein the coating is free of a polymer sealant.

15. The gate valve of claim 9, wherein a density of the coating is greater than 99 percent of the theoretical density.

16. The gate valve of claim 9, wherein the first component comprises a seat and the second component comprises a gate.

* * * * *